(12) United States Patent
Smith et al.

(10) Patent No.: US 10,294,893 B2
(45) Date of Patent: May 21, 2019

(54) SYSTEM AND METHOD FOR MONITORING A TRANSLATING COWL THRUST REVERSER

(71) Applicant: HONEYWELL INTERNATIONAL INC., Morris Plains, NJ (US)

(72) Inventors: Danis Burton Smith, Chandler, AZ (US); Robert Romano, Tempe, AZ (US); Kevin K. Chakkera, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 371 days.

(21) Appl. No.: 15/163,966

(22) Filed: May 25, 2016

(65) Prior Publication Data
US 2017/0342942 A1 Nov. 30, 2017

(51) Int. Cl.
| F02K 1/76 | (2006.01) |
| F01D 21/00 | (2006.01) |
| G01M 15/14 | (2006.01) |

(52) U.S. Cl.
CPC ............ *F02K 1/766* (2013.01); *F01D 21/003* (2013.01); *G01M 15/14* (2013.01); *F05D 2260/80* (2013.01); *F05D 2270/094* (2013.01)

(58) Field of Classification Search
CPC . F02K 1/766; F02K 1/62; F02K 1/625; F02K 1/70; F02K 1/72
See application file for complete search history.

(56) References Cited

U.S. PATENT DOCUMENTS

| 3,050,937 | A | * | 8/1962 | Varnell | .................. F02K 1/605 |
|  |  |  |  |  | 239/265.29 |
| 4,827,248 | A |  | 5/1989 | Crudden et al. |  |
| 5,826,823 | A |  | 10/1998 | Lymons et al. |  |
| 6,021,636 | A |  | 2/2000 | Johnson et al. |  |
| 6,293,489 | B1 |  | 9/2001 | Davies |  |
| 6,584,763 | B2 |  | 7/2003 | Lymons et al. |  |
| 6,622,964 | B2 |  | 9/2003 | Rouyer et al. |  |
| 6,688,098 | B2 |  | 2/2004 | Rouyer et al. |  |
| 7,007,454 | B2 |  | 3/2006 | Dehu et al. |  |
| 7,698,885 | B2 |  | 4/2010 | Beutin et al. |  |
| 8,038,184 | B2 |  | 10/2011 | Grigis |  |
| 8,070,101 | B2 |  | 12/2011 | Vauchel et al. |  |
| 8,628,128 | B2 |  | 1/2014 | Sternberger et al. |  |
| 9,109,536 | B2 |  | 8/2015 | Willett et al. |  |
| 9,188,081 | B2 |  | 11/2015 | Wingett et al. |  |
| 9,752,533 | B2 | * | 9/2017 | Allut | ....................... F02K 1/766 |
| 2003/0019206 | A1 |  | 1/2003 | Johnson |  |

(Continued)

FOREIGN PATENT DOCUMENTS

WO    WO-2015055957 A1 * 4/2015 ............. F02K 1/766

OTHER PUBLICATIONS

Extended EP Search Report for Application No. 17168903.7-1607 dated Oct. 17, 2017.

*Primary Examiner* — Gerald L Sung
*Assistant Examiner* — Rodolphe Andre Chabreyrie
(74) *Attorney, Agent, or Firm* — Lorenz & Kopf, LLP

(57) ABSTRACT

A system and method for monitoring a thrust reverser system are provided. The embodiments described herein utilize sensors located proximate locks comprising a thrust reverser locking system. The provided system and method detect deflection and displacement proximate the locks to determine when individual locks have failed.

20 Claims, 11 Drawing Sheets

(56) References Cited

U.S. PATENT DOCUMENTS

| | | | |
|---|---|---|---|
| 2003/0101712 A1* | 6/2003 | Johnson | F02K 1/76 60/226.2 |
| 2009/0193789 A1* | 8/2009 | Pero | F02K 1/70 60/226.2 |
| 2012/0228403 A1 | 9/2012 | Caruel et al. | |
| 2014/0137541 A1 | 5/2014 | Caruel | |
| 2014/0172201 A1 | 6/2014 | Colin et al. | |
| 2014/0270935 A1 | 9/2014 | Willett et al. | |
| 2016/0153399 A1* | 6/2016 | Sawyers-Abbott | F02K 1/72 239/1 |
| 2017/0298870 A1* | 10/2017 | Boileau | F02K 1/09 |
| 2018/0051653 A1* | 2/2018 | Smith | F02K 1/625 |

\* cited by examiner

SYSTEM AND METHOD FOR MONITORING A TRANSLATING COWL THRUST REVERSER

TECHNICAL FIELD

The present invention relates to a thrust reverser system for a turbine engine, and more particularly to a system and method for monitoring a translating cowl thrust reverser.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow in order to generate reverse thrust. When stowed, the thrust reverser typically forms a portion of the engine nacelle and forward thrust nozzle. When deployed, the thrust reverser typically redirects at least a portion of the airflow (from the fan and/or engine exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers affect only the airflow discharged from the engine fan. Whereas, mixed flow thrust reversers affect both the fan airflow and the airflow discharged from the engine core (core airflow).

Fan flow thrust reversers are typically used on relatively high-bypass ratio turbofan engines. Fan flow thrust reversers include so-called "Cascade-type" or "Translating Cowl-type" thrust reversers. Fan flow thrust reversers are generally positioned circumferentially around the engine core aft of the engine fan and, when deployed, redirect fan airflow through a plurality of cascade vanes disposed within an aperture of a reverse flow path. Typically, fan flow thrust reverser designs include one or more translating sleeves or cowls ("transcowls") that, when deployed, open an aperture, expose cascade vanes, and create a reverse flow path. Fan flow reversers may also include so-called pivot doors or blocker doors which, when deployed, rotate to block the forward thrust flow path.

In contrast, mixed flow thrust reversers are typically used with relatively low-bypass ratio turbofan engines. Mixed flow thrust reversers include so-call "Target-type," "Bucket-type," and "Clamshell Door-type" thrust reversers. These types of thrust reversers typically employ two or more pivoting doors that rotate, simultaneously opening a reverse flow path through an aperture and blocking the forward thrust flow path. However, a transcowl type thrust reverser could also be configured for use in a mixed flow application. When the transcowl is deployed, the transcowl and clamshell door configuration simultaneously opens a reverse flow path through an aperture and blocks the forward thrust flow path. Mixed flow thrust reversers are necessarily located aft or downstream of the engine fan and core, and often form the aft part of the engine nacelle.

As may be readily appreciated, it is undesirable to accidentally switch from forward thrust to reverse thrust; therefore, the thrust reverser designs generally employ a locking system to ensure that unplanned deployment of the thrust reverser is extremely improbable. A general locking system may comprise at least two, but often three or more locking elements, each locking element individually capable of retaining the thrust reverser in its stowed position. It is desirable that each locking element be independent of the others, so that a failure affecting one lock does not simultaneously affect the other locks. It is also desirable for the locking system to include a means for detecting locking system failures or malfunctions, so that they can be annunciated and repaired in a timely manner.

Emerging aircraft designs require locking methods and systems that provide improved detection of locking failures. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A thrust reverser system for a turbine engine is provided. The thrust reverser system comprising: a support structure configured to be mounted to the engine; a transcowl mounted on the support structure and comprising a circumferential front edge, the transcowl movable between a first position, in which the front edge substantially abuts the support structure, and a second position, in which an aperture is formed between the front edge and the support structure to redirect engine airflow, the transcowl comprising the qualities of (i) a continuous structure, and (ii) a predetermined flexibility; a primary locking system comprising a first lock and a second lock, the first and second lock configured to cooperatively lock the front edge to the support structure only when the transcowl is in the first position, the first lock coupled to the front edge at a first location and the second lock coupled to the front edge at a second location, the second location being different than the first location; a secondary locking system coupled to the stationary structure and comprising a third lock, the third lock coupled at a third location on the front edge, the third lock configured to lock the front edge to the support structure only when (i) the transcowl is in the first position, and (ii) a separation distance between the front edge and the support structure is substantially a secondary gap distance; and a system for monitoring a thrust reverser comprising a first sensor located proximate the first lock, a second sensor located proximate the second lock, wherein the first and second sensors are each configured to, when the transcowl is in the first position, detect a respective separation distance between the front edge and the support structure, a sensor module coupled to the first and second sensors, and configured to process respective separation distances and a first gap distance to determine (i) when the first lock has failed, and (ii) when the second lock has failed.

Also provided is a system for monitoring a thrust reverser for a turbine engine, the thrust reverser of the type having a support structure configured to be mounted to the engine, and a transcowl coupled to the support structure; the transcowl having a circumferential front edge, the transcowl movable between a first position, in which the front edge substantially abuts the support structure, and a second position, in which an aperture is formed between the front edge and the support structure to redirect engine airflow; the transcowl having the qualities of (i) a continuous structure, and (ii) a predetermined flexibility; the thrust reverser having a primary locking system comprising a first lock and a second lock, the first and second lock configured to cooperatively lock the front edge to the support structure only when the transcowl is in the first position, the first lock coupled to the front edge at a first location and the second lock coupled to the front edge at a second location, the second location being different from the first location; the system for locking a thrust reverser comprising: a first sensor located proximate the first lock and configured to detect a separation distance between the front edge and the support structure; a second sensor located proximate the second lock and configured to detect a separation distance between the front edge and the support structure; and a processor coupled to the first sensor and second sensor and configured to process respective separation distances and the predetermined flexibility of the transcowl to determine (i) when the first lock has failed, and (ii) when the second lock has failed.

Additionally provided is a method for monitoring a thrust reverser for a turbine engine; the thrust reverser of the type having a support structure configured to be mounted to the turbine engine, and a transcowl coupled to the support structure; the transcowl having a circumferential front edge, the transcowl movable between a first position, in which the front edge substantially abuts the support structure, and a second position, in which an aperture is formed between the front edge and the support structure to redirect engine airflow; the transcowl having the qualities of (i) a continuous structure, and (ii) a predetermined flexibility; the thrust reverser having a primary locking system comprising a first lock and a second lock, the first and second lock configured to cooperatively lock the front edge to the support structure only when the transcowl is in the first position, the first lock coupled to the front edge at a first location and the second lock coupled to the front edge at a second location, the second location being different from the first location, the method for monitoring a thrust reverser comprising: detecting, by a first sensor, a separation distance between the front edge and the support structure proximate the first lock; detecting, by a second sensor, a separation distance between the front edge and the support structure proximate the second lock; determining, by a processor coupled to the first sensor and second sensor, a first gap distance based on the predetermined flexibility of the transcowl; and determining, by the processor, (i) when the first lock has failed, and (ii) when the second lock has failed, based on the respective separation distances, and the first gap distance.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
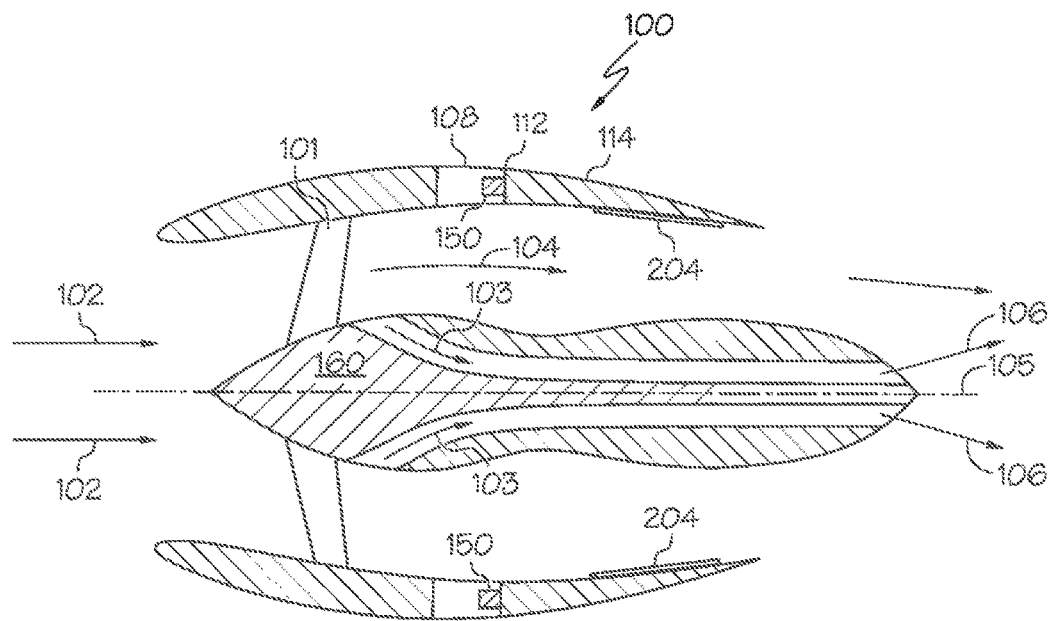
FIG. 1-FIG. 2 are section views of a system for monitoring a transcowl thrust reverser employed in an aircraft turbofan engine with a fan flow thrust reverser system, showing the thrust reverser (i) in a stowed position (FIG. 1), and (ii) in a deployed position (FIG. 2)

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented.

In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory devices, digital signal processing elements, logic elements, look-up tables, or the like, which may carry out a variety of functions under the control of one or more microprocessors or other control devices.

As used herein, "memory device" comprises any combination of processor-readable or computer-readable storage mediums, which can be realized in a non-transitory and tangible form. The "processor-readable medium" or "machine-readable medium" may include any medium that can store or transfer information. Examples of the processor-readable medium include an electronic circuit, a semiconductor memory device, a RAM, a ROM, a flash memory, an erasable ROM (EROM), a floppy diskette, a removable disk, a CD-ROM, an optical disk, a hard disk, In various embodiments, the memory device may be integral to a respective processor. Memory devices may store non-transitory computer readable instructions and program code for operating the below described system, and the functional or logical module/components of the below described system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order in accordance with such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As described, a transcowl thrust reverser creates an active reverse flow path, thereby generating reverse thrust, and slowing the aircraft. Two described transcowl thrust reverser design categories are illustrated in FIGS. 1-4, which provide section views, for background and context. Starting with FIG. 5, various embodiments provided herein are directed to a system for monitoring a transcowl thrust reverser suitable for an aircraft turbine engine, and methods for producing the same. As will be apparent from the detail below, the exemplary embodiments advantageously provide improvements in detecting a failed lock in a transcowl thrust reverser system. The embodiments described below are merely examples and serve as a guide for implementing the novel systems and methods herein on any industrial, commercial, military, or consumer turbine engine application. As such, the examples presented herein are intended as non-limiting.

Turning to FIG. 1, a turbofan engine is substantially encased within an aerodynamically smooth outer covering, the nacelle 100. Nacelle 100 wraps around the turbofan engine 160 and forms an aerodynamically shaped cavity around an engine centerline 105, thereby providing an engine exhaust flow 106 when the aircraft is generating forward thrust. Ambient air 102 enters the turbofan engine and passes through a fan 101. A portion of this air will be pressurized, mixed with fuel and ignited, generating hot gasses known as core flow 103. The remainder of this air bypasses the engine 160 core and is known as fan flow 104. Together, fan flow and core flow become the engine exhaust flow 106 that is discharged, generating forward thrust.

Nacelle 100 comprises a thrust reverser with annular support structure 108 and an annular translatable cowl, or transcowl 114. Transcowl 114 is mounted adjacent to the annular support structure 108 and extends aft therefrom. In a forward thrust position of a typical thrust reverser system, a front edge 112 of the transcowl 114 abuts with the annular support structure 108, creating a substantially smooth and continuous cavity for the fan flow 104 and exhaust flow 106, thereby generating forward thrust. The annular support structure 108 provides rigid support to which moveable thrust reverser components (described in detail below) may be mounted, and serves to mount the thrust reverser to the turbofan engine. A system for monitoring a transcowl thrust reverser 150 is shown coupled to front edge 112, and is described in more detail in connection with FIG. 5.

Figure 2:
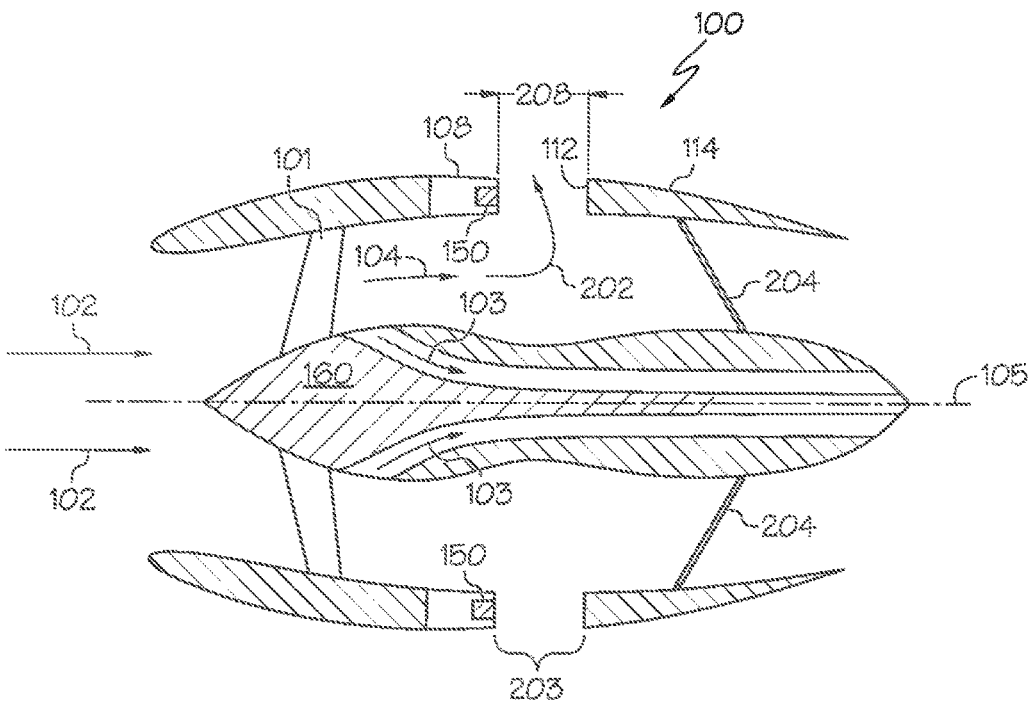

Turning next to FIG. 2, a typical thrust reverser transitions to the reverse thrust position by translating transcowl 114 aft from the annular support structure 108 by a predetermined distance 208, creating a reverse flow aperture 203. Concurrently with the transcowl movement, displaceable blocker doors 204 pivot to obstruct the fan flow 104 or exhaust flow 106. This coordinated motion of the transcowl 114 and displaceable blocker doors 204 creates an active reverse flow path 202, thereby generating reverse thrust, and slowing the aircraft. In a typical thrust reverser system, the transition from the forward thrust position to the reverse thrust position may occur as a single, continuous motion.

Although not the focus of the present invention, a variety of different mechanisms (not shown) may be used to couple internal doors to transcowls such that they stow and deploy in tandem. These mechanisms could range from a single connecting link to a complex kinematic linkage system. In any of the possible combinations, this linkage system is what transfers the linear transcowl motion into rotary (pivoting) internal door motion. Various embodiments of the internal doors are supported.

Figure 3:
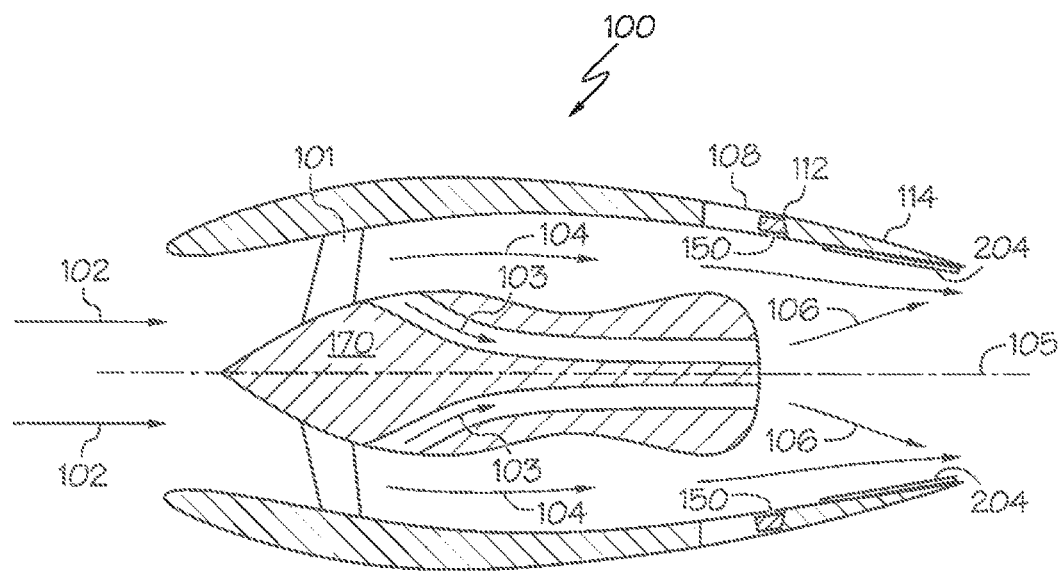
FIG. 3-FIG. 4 are section views of a system for monitoring a transcowl thrust reverser employed in an aircraft turbofan engine with a mixed flow thrust reverser system, showing the thrust reverser (i) in a stowed position (FIG. 3) and (ii) a deployed position (FIG. 4)
Figure 4:
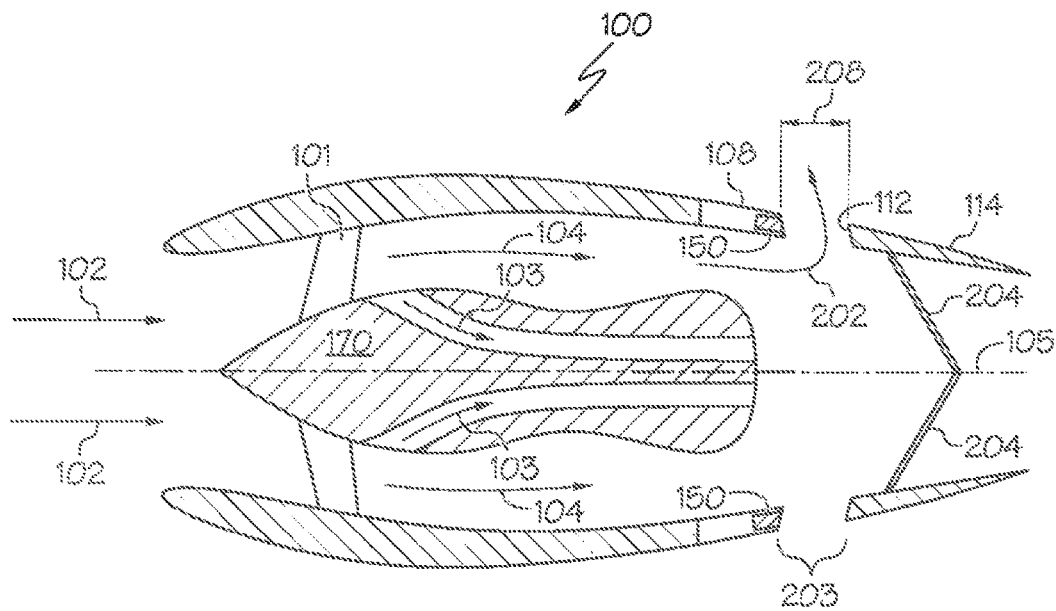

FIG. 3 depicts a mixed flow thrust reverser in a stowed position, and FIG. 4 depicts a mixed flow thrust reverser in a deployed position. As is observable by comparing FIG. 1 to FIG. 3 and FIG. 2 to FIG. 4, (1) each thrust reverser design employs a transcowl, and (2) a fan flow and a mixed flow thrust reverser design differ in a location of the reverse flow aperture 203 with respect to the engine nacelle 100, and whether the blocker doors 204, when deployed, abut with each other or with the engine 160 or engine 170 body. The provided system for monitoring a transcowl thrust reverser 150 may be employed with either type of thrust reverser, and is described in more detail in connection with FIG. 5.

Figure 5:
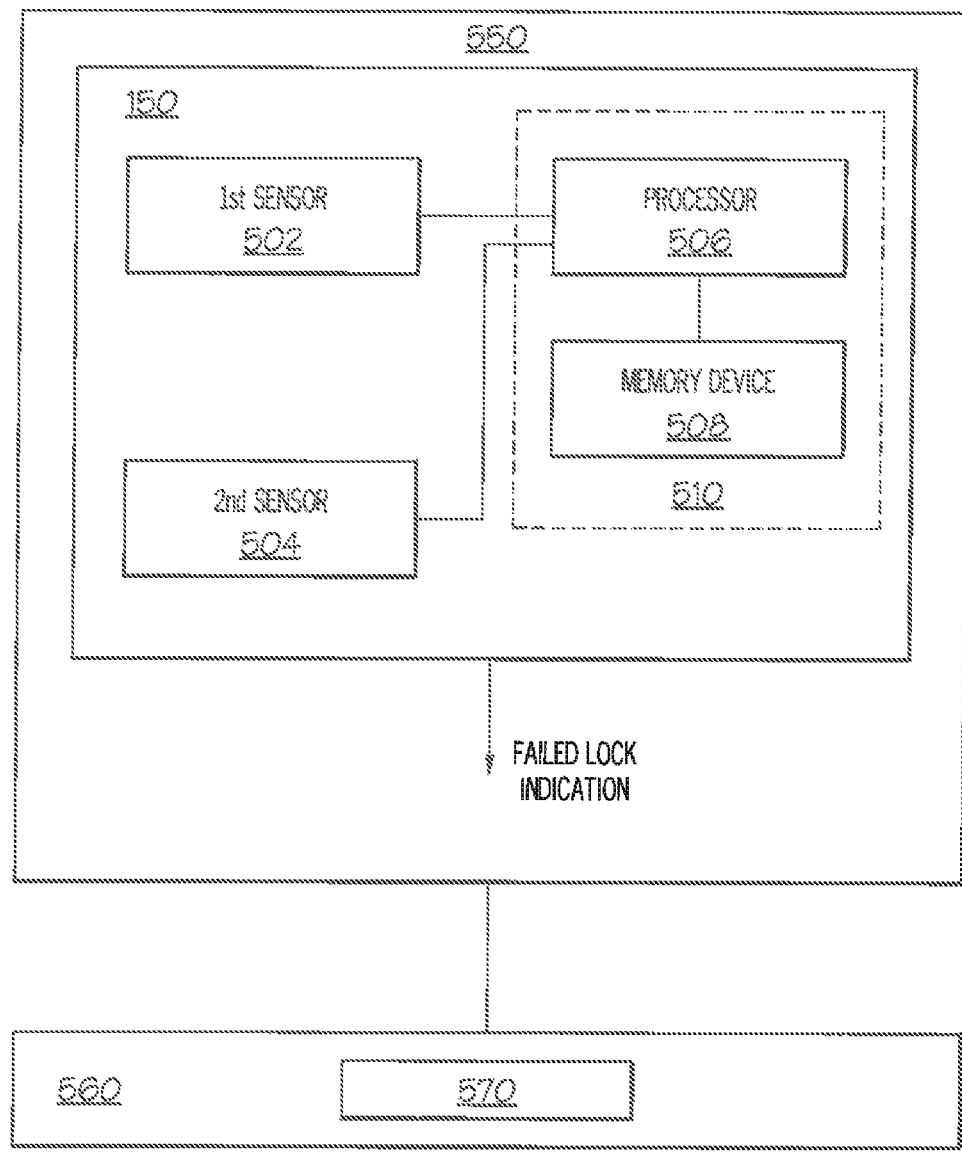
FIG. 5 is a system diagram illustrating a system for monitoring a transcowl thrust reverser employed within an aircraft, in accordance with various exemplary embodiments.

FIG. 5 is a system diagram showing a system for monitoring a transcowl thrust reverser 150 employed in an aircraft 560, in accordance with various embodiments. Within the system for monitoring a transcowl thrust reverser 150, a sensor module 510 comprises a processor 506 and a memory device 508. The sensor module 510 is coupled to a first sensor 502 and a second sensor 504. In various embodiments, the system for monitoring a transcowl thrust reverser 150 may be coupled to thrust reverser system 550, which may in turn be coupled to aircraft 560 and turbofan engine

570. In various embodiments, the first sensor 502 is positioned proximate to a first primary lock and the second sensor 504 is positioned proximate to a second primary lock. FIGS. 6-11 describe locations of primary locks, and the location, orientation, and function of the respective sensors 502 and 504.

The sensors 502 and 504 may comprise any available sensing technology sufficient to detect displacement and deflection in the order of magnitude and with the sensitivity described herein. The first sensor 502 provides a first sensor signal with separation distance information to the processor 506 and the second sensor 504 provides a second sensor signal with separation distance information to the processor 506. Based on the provided sensed separation distance information, the processor 506 makes one or more failed lock determinations and the sensor module 510 generates one or more failed lock indications or alerts. Exemplary process steps for a system for monitoring a transcowl thrust reverser 150 are described in connection with FIG. 13. The failed lock indications are signals that are sufficient for being transmitted to or sensed by a display system or human machine interface (not shown), which enables operators to take action accordingly.

In various embodiments, the first sensor 502 and the second sensor 504 may be two of a plurality of sensor devices coupled to the processor 506, each sensor being located proximate a respective primary lock and configured to determine a respective separation distance. Accordingly, the system for monitoring a transcowl thrust reverser 150 is further configured to determine when each lock, exclusively, of a plurality of primary locks comprising the primary locking system, has failed.

Figure 6:
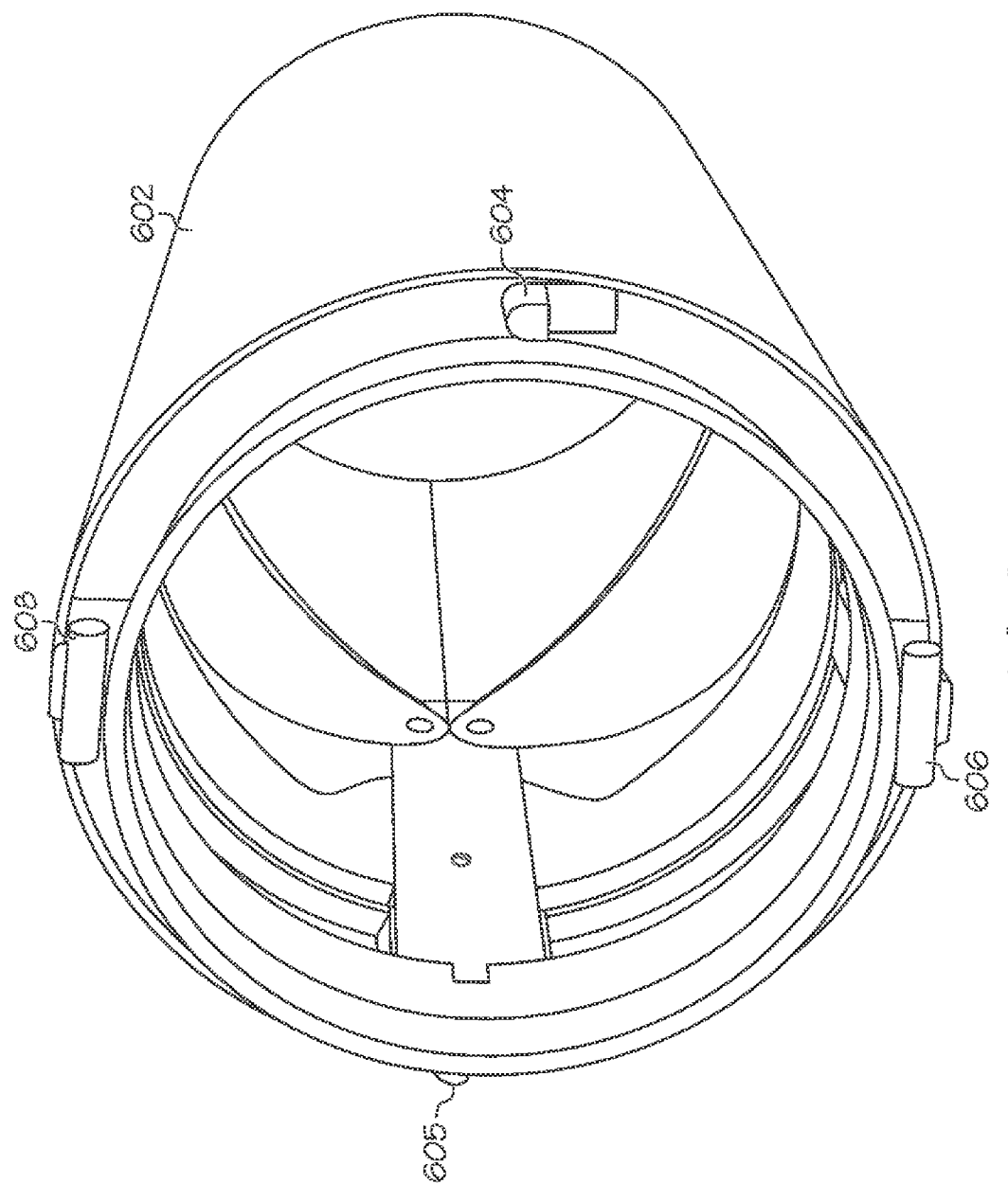
FIG. 6 is a three dimensional image of a transcowl thrust reverser system in a stowed (first) position, showing a system for monitoring a transcowl thrust reverser, in accordance with various exemplary embodiments.
Figure 7:
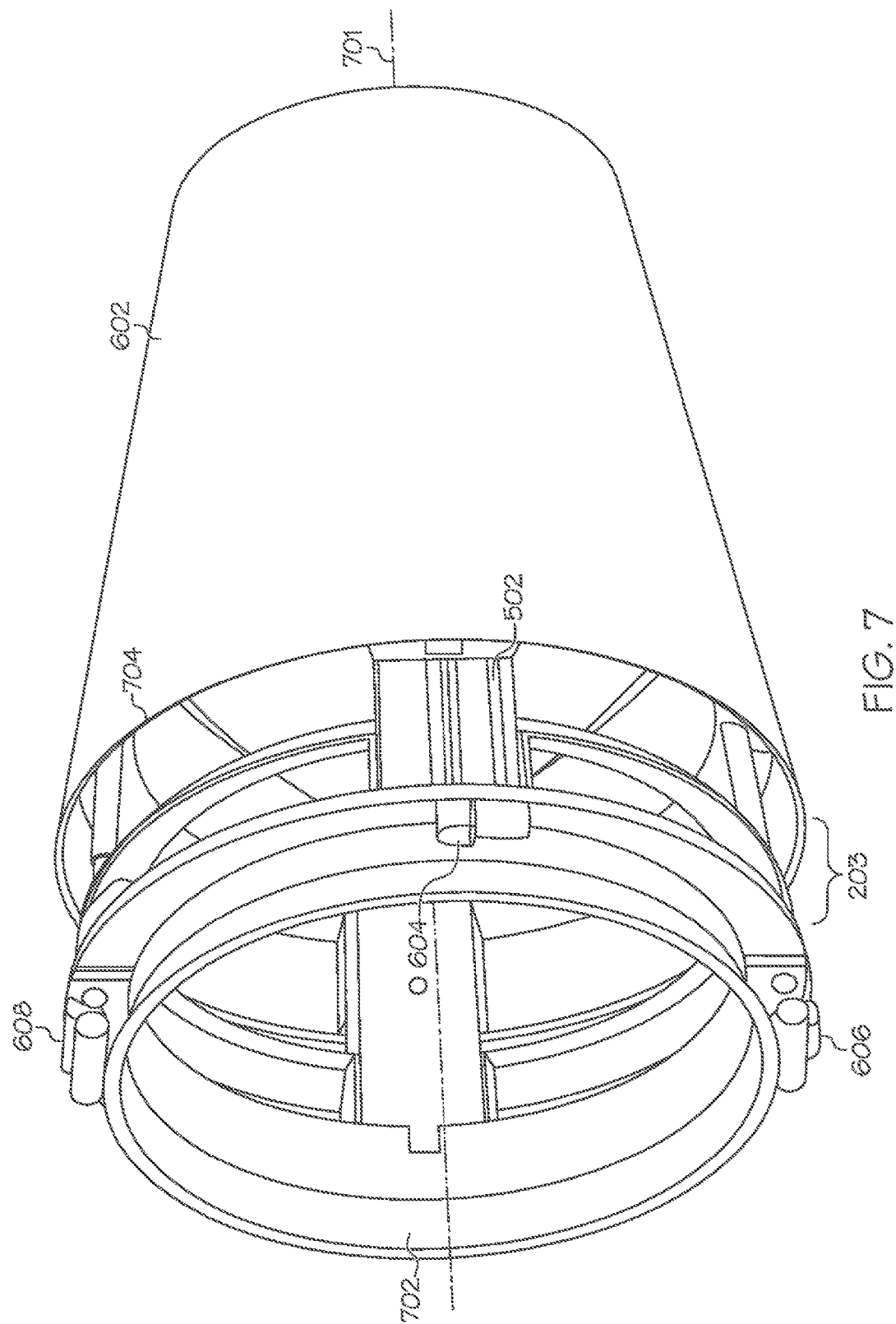
FIG. 7 is a three dimensional image of the thrust reverser system of FIG. 6 in a deployed (second) position, in accordance with various exemplary embodiments.
Figure 8:
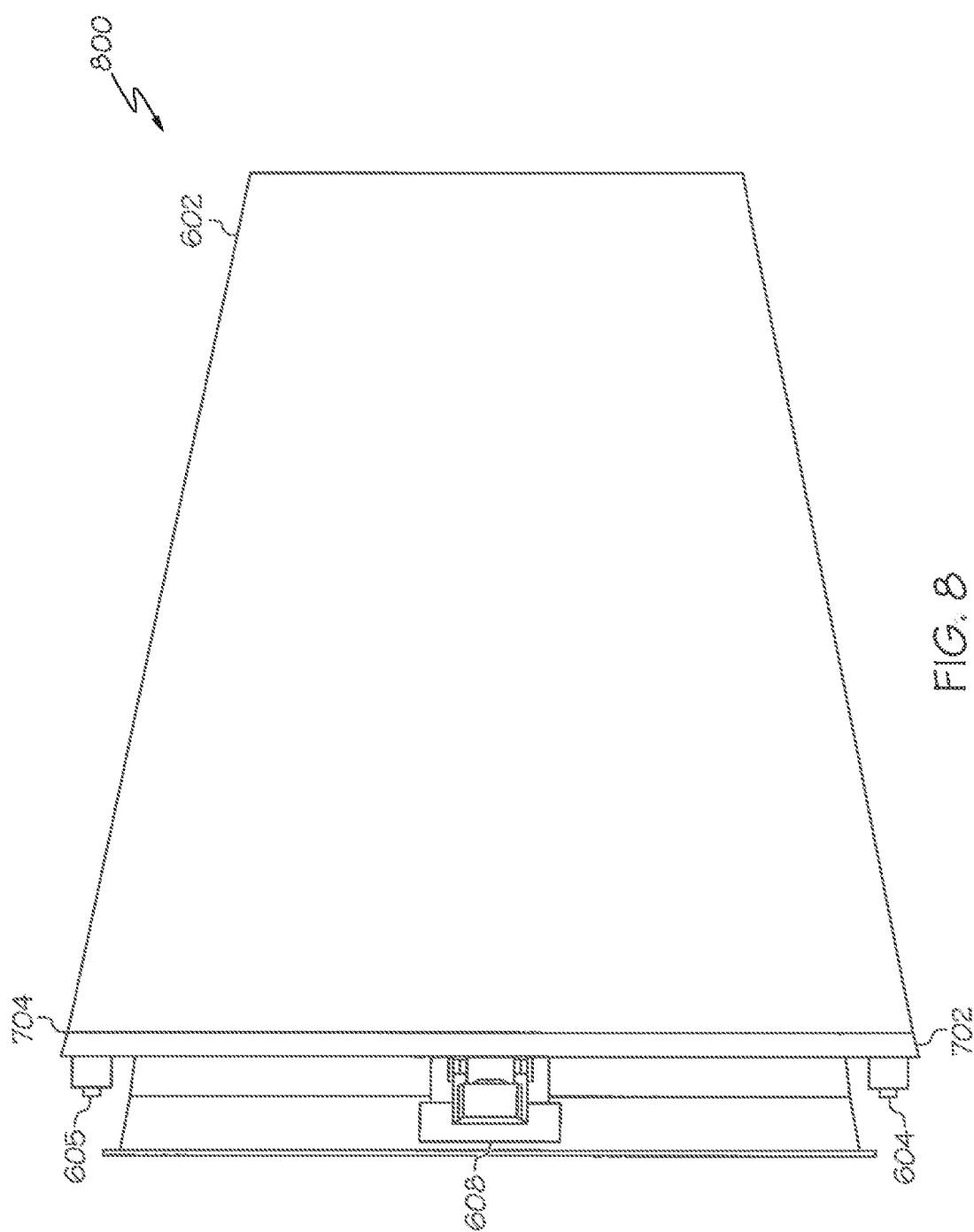
FIG. 8 is a three dimensional top view image of the thrust reverser system of FIG. 6 and FIG. 7, with the transcowl in its first position with all primary locks engaged.
Figure 9:
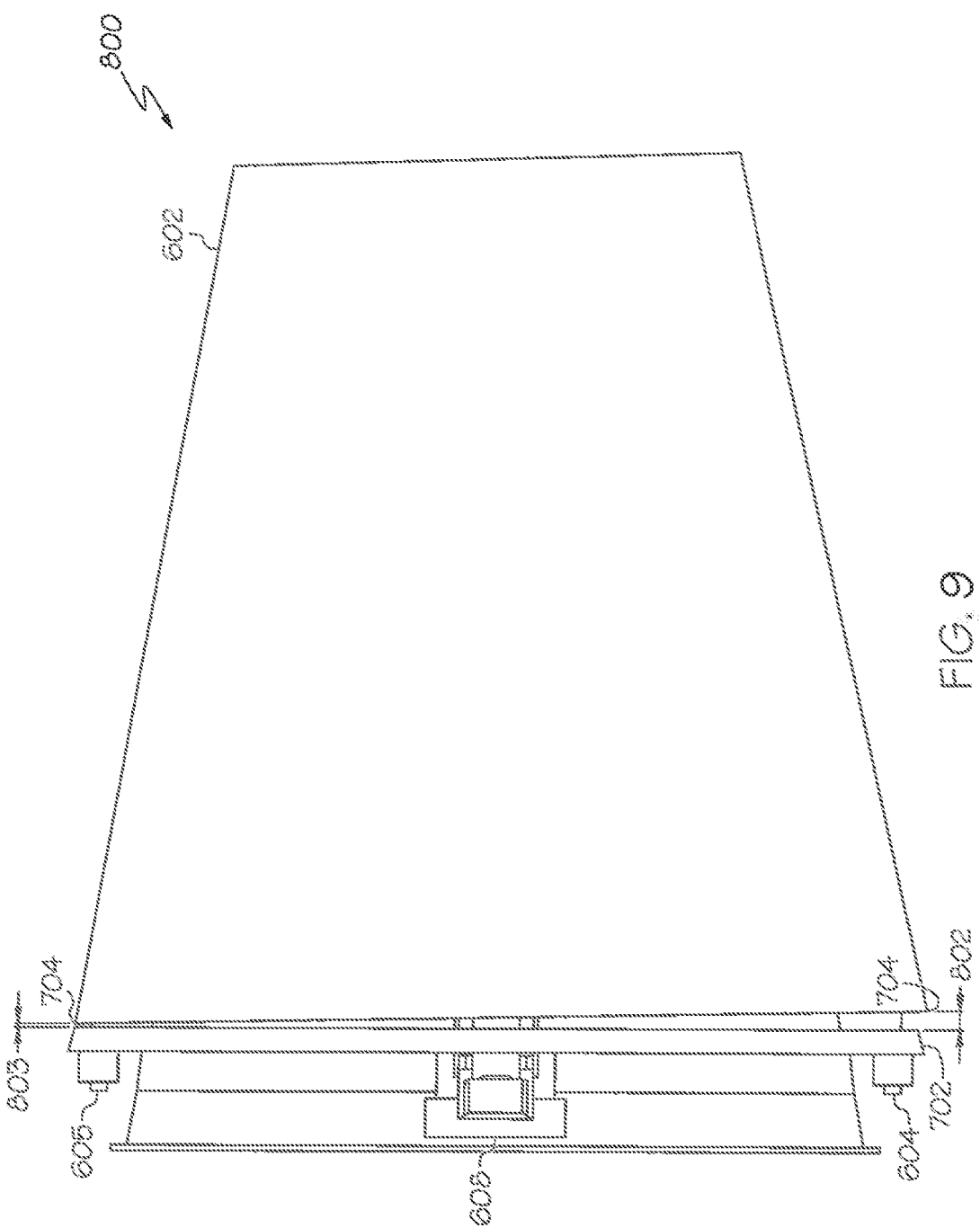
FIG. 9 is a three dimensional top view image of the thrust reverser system of FIG. 6 and FIG. 7, with the transcowl in its first position and one primary lock failed, depicting transcowl deflection, in accordance with various exemplary embodiments.
Figure 10:
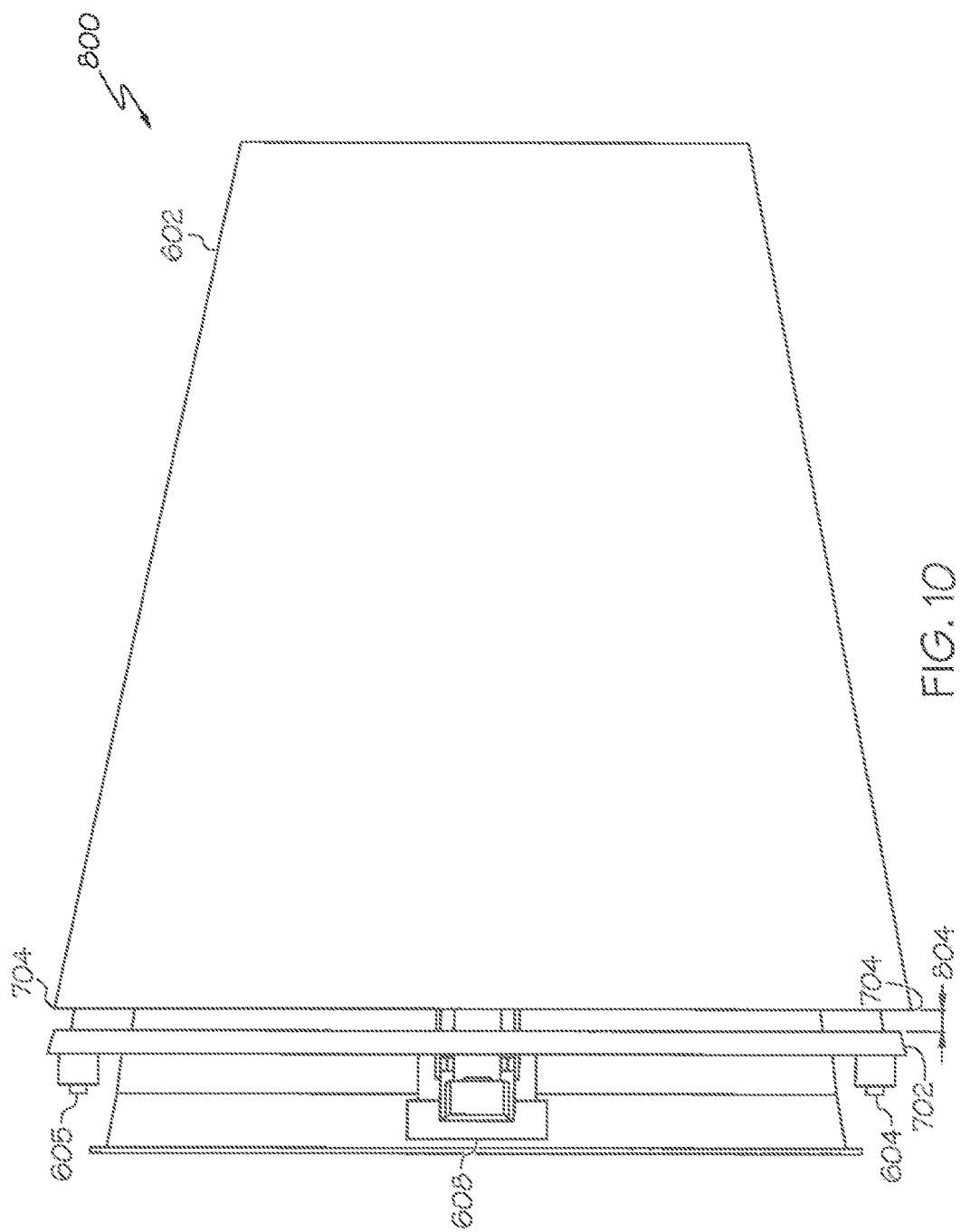
FIG. 10 is a three dimensional top view image of the thrust reverser system of FIG. 6 and FIG. 7, with the transcowl in its first position with all primary locks failed, depicting transcowl displacement, in accordance with various exemplary embodiments.
Figure 11:
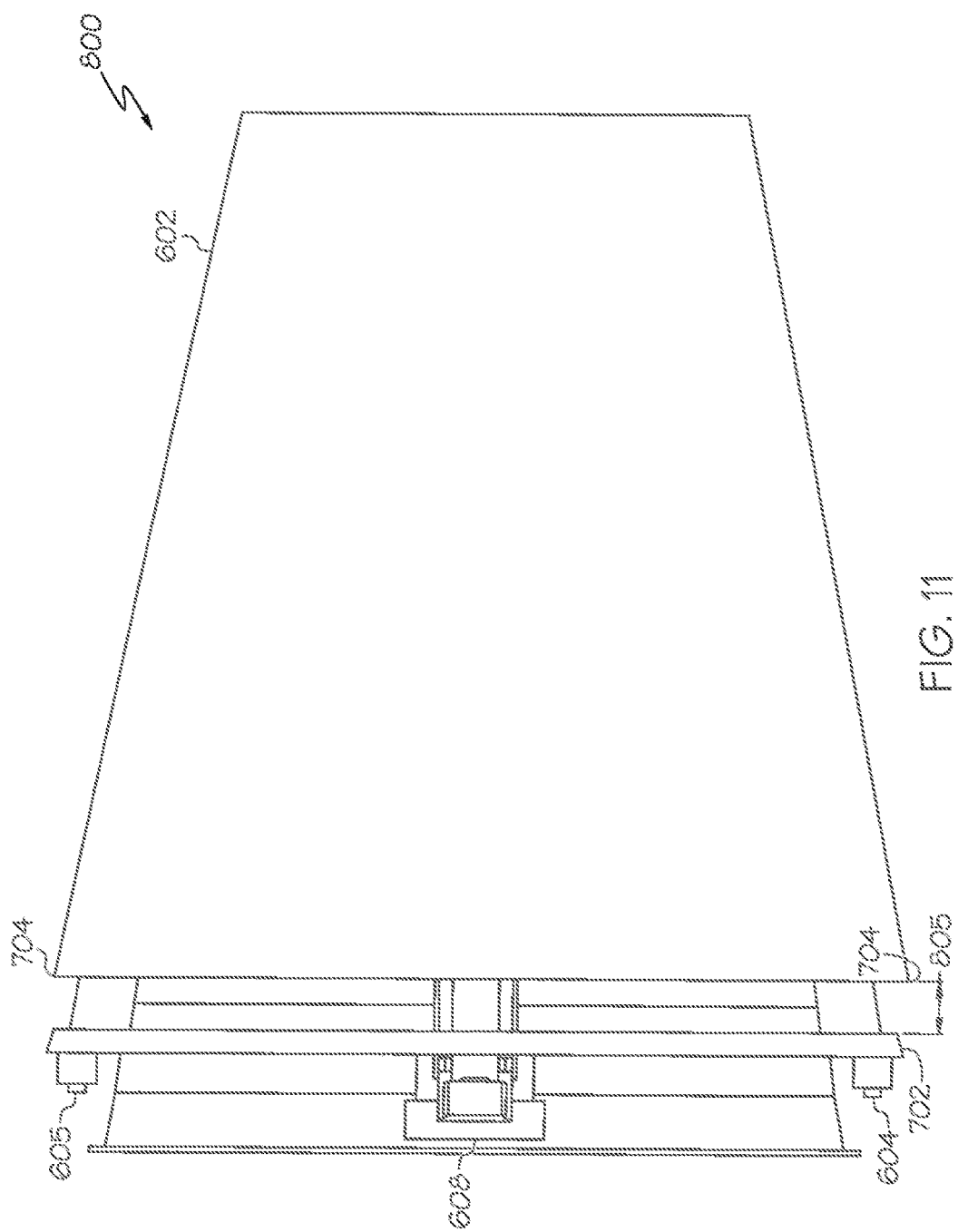
FIG. 11 is a three dimensional top view image of the thrust reverser system of FIG. 6 and FIG. 7, with all primary and secondary locks failed, depicting transcowl displacement, in accordance with various exemplary embodiments.

FIGS. 6-11 provide three dimensional images of a thrust reverser system having a system for monitoring a transcowl thrust reverser 150, in accordance with various exemplary embodiments. FIGS. 6 and 7 depict the thrust reverser system in its first and second positions, respectively. FIG. 8 depicts the thrust reverser system in its first position with all primary locks engaged. FIG. 9 depicts the thrust reverser system in its first position with one primary lock failed. FIG. 10 depicts the thrust reverser system in its first position with all primary locks failed. FIG. 11 depicts the thrust reverser system with all primary and secondary locks failed. In the provided figures, transcowl 602 surrounds the thrust reverser centerline 701. A primary locking system coupled to the support structure 702 comprises a first lock 604 and a second lock 605 that are independent of an existing actuation system (such as that shown in FIG. 12) and configured to cooperatively lock the front edge 704 of the transcowl 602 to the support structure 702 only when the transcowl 602 is in the first position. The first lock 604 is coupled to the front edge 704 at a first location and the second lock 605 is coupled to the front edge 704 at a second location, wherein the first and second locations are different from each other on the front edge 704.

The system for monitoring a transcowl thrust reverser 150 comprises a first sensor 502 located proximate the first lock 604, and a second sensor 504 (obscured in FIG. 7) located proximate the second lock 605. The first sensor 502 and the second sensor 504 are each configured to, when the transcowl 602 is in the first position, (i) detect, measured at their respective locations, a separation distance 802 between the front edge 704 and the annular support structure 702, and (ii) generate a respective sensor output therefrom. In an embodiment, the system for monitoring a transcowl thrust reverser 150 references a first gap distance and a second gap distance stored in the memory device 508 to process the respective output signals from the first sensor 502 and the second sensor 504.

In embodiments having a plurality of primary locks, each lock of the plurality of locks may have a sensor located proximate to it, each sensor configured to sense a respective separation distance 802. In accordance with the above, the sensor module 510 processes received sensor output signals to determine therefrom when and which respective locks have failed.

A secondary locking system is also depicted in FIGS. 6-11. Secondary locking system may comprise third lock 606 coupled to the front edge 704 at a third location. The secondary locking system is designed to stop transcowl 602 displacement aft when the primary locking system has failed. The secondary locking system is designed to engage when the entire primary locking system fails, therefore generally permitting a predetermined amount of travel aft by the transcowl 602 before locking and halting further displacement. The predetermined amount of travel is depicted as secondary gap 904; secondary gap 904 is an application specific distance that may be based on characteristics of the primary locking system.

The secondary locking system may take a variety of forms, for example, latch 902 may be configured to contact a stopping structure 906 when transcowl 602 has traveled aft the secondary gap 904 distance. Accordingly, secondary locking system is configured to lock the front edge 704 to the support structure 702 only when (i) the transcowl 602 is in the first position, and (ii) a separation distance 802 between the front edge 704 and the support structure 702 is substantially the secondary gap distance. In various embodiments, secondary locking system comprises additional locks, such as fourth lock 608, also coupled to the front edge 704, at a fourth location. As stated, the secondary gap 904 distance generally represents an amount of travel aft that implies that all locks in the primary locking system have failed.

The present invention enables the determination of when one or more individual primary locks have failed, thereby providing failure detection prior to the engagement of the secondary locking system. Specifically, the qualities of the transcowl 602 enable the system for monitoring a transcowl thrust reverser 150 to determine that a sensed separation distance 802 indicates deflection rather than displacement, and sensed deflection is associated with an individual primary lock failure. As used herein, deflection comprises an uneven separation distance around the circumference between front edge 704 and support structure 702. Referring back to FIG. 9, deflection is depicted with linearly measured separation distances; separation distance 802 proximate to the first lock 604 is observably larger than separation distance 803 proximate to the second lock 605.

In order to determine that a sensed separation distance 802 indicates deflection rather than displacement, the transcowl 602 design advantageously comprises the qualities of: (i) a continuous structure, and (ii) a predetermined flexibility. In order to achieve a continuous structure, the transcowl 602 may comprise a single component or a plurality of components that are integrated or rigidly attached, so as to function as a single component. A transcowl 602 having qualities of a continuous structure with predetermined flexibility, when subjected to the gas pressures associated with forward and reverse thrust operation, will exhibit a unique deflection that may be modeled and tested. For example, holding dimensions and gas pressure constant, a transcowl 602 comprising a more flexible material may deflect more than a transcowl 602 comprising a less flexible material.

Based on the qualities of the transcowl 602, a first gap distance may be determined, wherein the first gap distance represents deflection and is smaller than the secondary gap distance described above in connection with engaging the secondary locking system.

Further, dependent upon the qualities of the transcowl 602, the deflection of the transcowl 602 may be sensed in a localized area, such as, in response to a failure of the (primary) first lock 604, when the (primary) second lock 605 has not failed, or vice versa. Accordingly, the provided embodiments enable detection and identification of a single primary lock failure. In embodiments having a plurality of primary locks, the same principles and analysis apply for detection and identification of individual primary lock failures among the plurality of primary locks.

Figure 12:
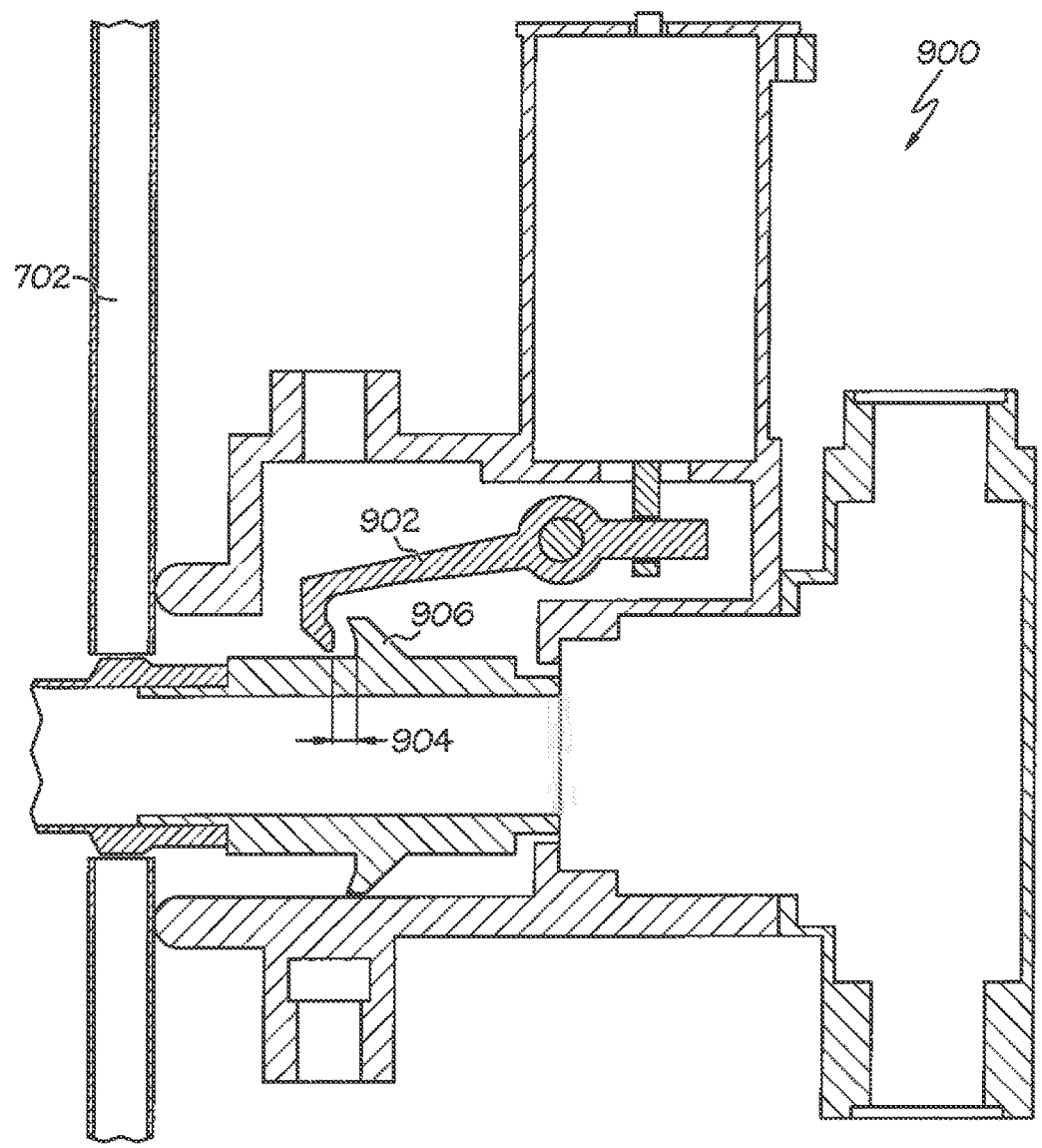
FIG. 12 is a partial cross sectional view of a thrust reverser system depicting a secondary lock internal to an actuator, in accordance with various embodiments.

In various embodiments, components of the secondary locking system are housed within the actuator 900. Referring now to FIG. 12, an actuator 900, which is a movable thrust reverser component that causes the transcowl 602 to move, is depicted. The actuator 900 may be mounted to support structure 702 and coupled to the Transcowl 602. When the actuator 900 extends, it causes the transcowl 602 to translate from the stowed (first) position to the deployed (second) position, when the actuator 900 retracts it returns transcowl 602 from the deployed position to the stowed position.

As is readily appreciated, the first gap distance described above (and used in determining when only primary locks have failed) is selected to be less than the secondary gap 904 distance. If a failure of all primary locks occurs, the transcowl will displace until the secondary gap distance 904 is exhausted, producing a separation distance 804 that is greater than separation distance 802, and substantially equal to secondary gap distance 904. Further, the system for monitoring a transcowl thrust reverser 150 may employ a second gap distance, selected to be greater than the secondary gap 904, to assist in determining when all primary locks and secondary locks have failed. By designing the second gap distance to be larger than secondary gap 904, a detected displacement or separation distance 805 that is greater than secondary gap 904 may be used to determine a secondary locking system failure. In an embodiment, the first gap distance is from about 0.1 inch to about 0.25 inch, and the second gap distance is from about the first gap distance to about 1 inch.

Figure 13:
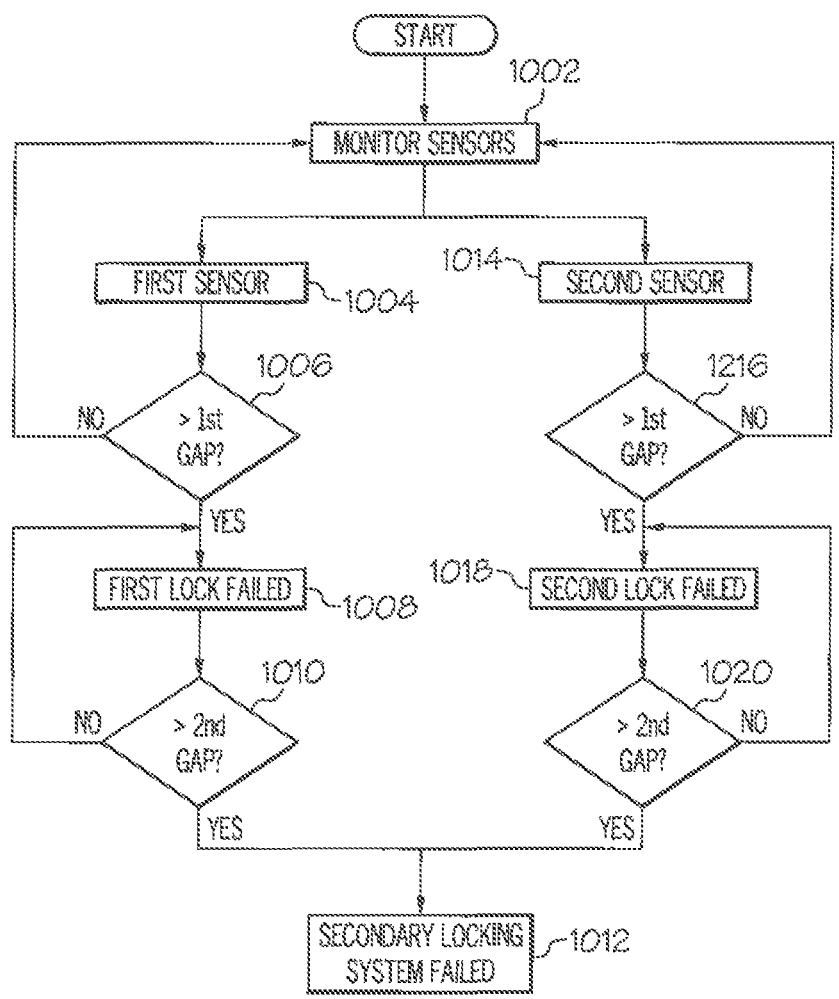
FIG. 13 is a flow chart of process steps for a system for monitoring a transcowl thrust reverser, in accordance with various embodiments.

FIG. 13 provides process steps for a method for monitoring a transcowl thrust reverser 1000 (hereinafter "method"), in accordance with various embodiments. At 1002, all sensors coupled to sensor module 510 are monitored. In an embodiment, the method 1000 references the memory device 508 for a first gap distance and a second gap distance and processes the gap distance(s) with the respective output signals from the first sensor 502 and the second sensor 504. In an alternative embodiment, the method 1000 processes material and dimensions information for the transcowl 602 that have been stored in the memory device 508 to determine the first gap distance.

At 1004, output signal from the first sensor 502 is monitored. When the output signal from the first sensor 502 indicates that separation distance 802 at the first lock 604 is greater than the first gap distance (at 1006), the method 1000 determines that the (primary) first lock 604 has failed (at 1008). Similarly, at 1014, output signal from the second sensor 504 is monitored. When the output signal from the second sensor 504 indicates that separation distance 802 at the second lock 605 is greater than the first gap distance (at 1216), the method 1000 determines that the (primary) second lock 605 has failed (at 1018). In embodiments comprising a plurality of primary locks, this process may be repeated for each primary lock of the plurality of primary locks. Based on the output from the first sensor 502, the output from the second sensor 504, and the first gap distance, the method 1000 may determine (via sensor module 510) any combination of the following failed primary lock conditions: (i) the first lock 604 has failed and the second lock 605 has not failed, (ii) the second lock 605 has failed and the first lock 604 has not failed, and (iii) all of the primary locks have failed (i.e., in the example, the first lock 604 and the second lock 605 have both failed).

As is readily apparent, method 1000 may rely on either first sensor 502 (at 1010) or second sensor 504 (at 1020) to determine when the secondary locking system has failed. At 1010, when the output signal from the first sensor 502 indicates the separation distance 805 is greater than the second gap distance, the method 1000 determines that the secondary locking system (i.e., the third lock 606) has failed (at 1012). Likewise, at 1020, when the output signal from the second sensor 504 indicates the separation distance 805 is greater than the second gap distance, the method 1000 determines that the secondary locking system (i.e., the third lock 606) has failed (at 1012).

Taken together, based on the output from the first sensor 502, the output from the second sensor 504, the first gap distance and the second gap distance, the method 1000 may determine any combination of the following failed primary lock and secondary lock conditions: (i) the first lock 604 has failed and the second lock 605 has not failed, (ii) the second lock 605 has failed and the first lock 604 has not failed, and (iii) the first lock 604, second lock 605 and secondary locking system (i.e., the third lock 606) have failed (at 1012).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Some of the embodiments and implementations are described above in terms of functional and/or logical block components (or modules). However, it should be appreciated that such block components, including components referred to as a "module," may be realized by any number of hardware, software, firmware, electronic control component, processing logic, and/or processor device, individually or in any combination, configured to perform the specified functionality. Accordingly, functional blocks and modules may include, without limitation: an application specific integrated circuit (ASIC), an electronic circuit, a processor (shared, dedicated, or group) and a memory device that executes one or more software or firmware programs, a combinational logic circuit, and/or other suitable components.

To clearly illustrate this interchangeability of hardware and software, these illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

What is claimed is:

1. A thrust reverser system for a turbine engine, comprising:
    a support structure configured to be mounted to the engine;
    a transcowl mounted on the support structure and comprising a circumferential front edge, the transcowl movable between a first position, in which the front edge substantially abuts the support structure, and a second position, in which an aperture is formed between the front edge and the support structure to redirect engine airflow, the transcowl comprising the properties of (i) a continuous structure, and (ii) a predetermined flexibility;
    a primary locking system comprising a first lock and a second lock, the first and second lock configured to cooperatively lock the front edge to the support structure only when the transcowl is in the first position, the first lock coupled to the front edge at a first location and the second lock coupled to the front edge at a second location, the second location being different than the first location;
    a secondary locking system coupled to the support structure and comprising a third lock, the third lock coupled at a third location on the front edge, the third lock configured to lock the front edge to the support structure only when (i) the transcowl is in the first position, and (ii) a separation distance between the front edge and the support structure is substantially a secondary gap distance; and
    a system for monitoring the primary and secondary locking system comprising
        a first sensor located proximate the first lock,
        a second sensor located proximate the second lock, wherein the first and second sensors are each configured to, when the transcowl is in the first position, detect a respective separation distance between the front edge and the support structure,
        a sensor module coupled to the first and second sensors, and configured to process respective separation distances and a first gap distance to determine (i) when the first lock has failed, and (ii) when the second lock has failed.

2. The system of claim 1, wherein the first gap distance is based on the predetermined flexibility of the transcowl.

3. The system of claim 2, wherein the secondary gap distance is greater than the first gap distance.

4. The system of claim 3, wherein the sensor module is further configured to process a second gap distance that is greater than the secondary gap distance, to determine when the secondary locking system has failed.

5. The system of claim 2, wherein the first lock and the second lock are two of a plurality of primary locks, each coupled to the front edge and configured to cooperatively lock the front edge to the support structure only when the transcowl is in the first position.

6. The system of claim 5, wherein the sensor module is further configured to determine when each of the plurality of primary locks comprising the primary locking system has failed.

7. The system of claim 4, wherein the first gap distance is from about 0.1 inch to about 0.25 inch, and the second gap distance is from about the first gap distance to about 1 inch.

8. The system of claim 2, further comprising a turbofan engine, and wherein the engine includes a turbofan coupled to the thrust reverser.

9. The system of claim 8, further comprising an aircraft, and wherein the turbofan engine is mounted to the aircraft.

10. A system for monitoring a thrust reverser for a turbine engine, the thrust reverser of the type having a support structure configured to be mounted to the engine, and a transcowl coupled to the support structure; the transcowl having a circumferential front edge, the transcowl movable between a first position, in which the front edge substantially abuts the support structure, and a second position, in which an aperture is formed between the front edge and the support structure to redirect engine airflow; the transcowl having the properties of (i) a continuous structure, and (ii) a predetermined flexibility; the thrust reverser having a primary locking system comprising a first lock and a second lock, the first and second lock configured to cooperatively lock the front edge to the support structure only when the transcowl is in the first position, the first lock coupled to the front edge at a first location and the second lock coupled to the front edge at a second location, the second location being different from the first location, the system for monitoring a thrust reverser comprising:
    a first sensor located proximate the first lock and configured to detect a first separation distance between the front edge and the support structure;
    a second sensor located proximate the second lock and configured to detect a second separation distance between the front edge and the support structure; and
    a processor coupled to the first sensor and second sensor and configured to process the first and second separation distances and the predetermined flexibility of the transcowl to determine (i) when the first lock has failed, and (ii) when the second lock has failed.

11. The system of claim 10, further comprising a secondary locking system coupled to the support structure and configured to lock the front edge, at a third location on the front edge, to the support structure only when (i) the transcowl is in the first position, and (ii) a separation distance between the front edge and the support structure is substantially a secondary gap distance, wherein the third location is different than the first location and the second location.

12. The system of claim 11, wherein the processor is further configured to determine a first gap distance that is less than the secondary gap distance, based on the predetermined flexibility of the transcowl.

13. The system of claim 12, wherein the processor is further configured to process a second gap distance that is greater than the secondary gap distance, to determine when the secondary locking system has failed.

14. The system of claim 13, wherein the first lock and the second lock are two of a plurality of primary locks, each coupled to the front edge and configured to cooperatively lock the front edge to the support structure only when the transcowl is in the first position.

15. The system of claim 14, further comprising a plurality of sensors coupled to the processor, each sensor of the plurality of sensors is (i) located proximate a respective primary lock, and (ii) configured to determine a respective separation distance, and wherein the processor is further configured to determine when each lock of the plurality of primary locks comprising the primary locking system has failed.

16. The system of claim 15, wherein the first gap distance is from about 0.1 inch to about 0.25 inch, and the second gap distance is from about the first gap distance to about 1 inch.

17. A method for monitoring a thrust reverser for a turbine engine, the thrust reverser of the type having a support structure configured to be mounted to the turbine engine, and a transcowl coupled to the support structure; the transcowl having a circumferential front edge, the transcowl movable between a first position, in which the front edge substantially abuts the support structure, and a second position, in which an aperture is formed between the front edge and the support structure to redirect engine airflow; the transcowl having the properties of (i) a continuous structure, and (ii) a predetermined flexibility; the thrust reverser having a primary locking system comprising a first lock and a second lock, the first and second lock configured to cooperatively lock the front edge to the support structure only when the transcowl is in the first position, the first lock coupled to the front edge at a first location and the second lock coupled to the front edge at a second location, the second location being different from the first location, the method for monitoring a thrust reverser comprising:

detecting, by a first sensor, a first separation distance between the front edge and the support structure proximate the first lock, detecting, by a second sensor, a second separation distance between the front edge and the support structure proximate the second lock;

determining, by a processor coupled to the first sensor and second sensor, a first gap distance based on the predetermined flexibility of the transcowl; and determining, by the processor, (i) when the first lock has failed, and (ii) when the second lock has failed, based on the first and second separation distances, and the first gap distance; and displaying on a display system one or more failed lock indications when the processor has determined that (i) the first lock has failed, and (ii) the second lock has failed.

18. The method of claim 17, further comprising mounting a secondary locking system to the support structure, the secondary locking system configured to lock the front edge, at a third location on the front edge, to the support structure only when (i) the transcowl is in the first position, and (ii) a separation distance between the front edge and the support structure is substantially a secondary gap distance, wherein the third location is different than the first location and the second location, and the secondary gap distance is greater than the first gap distance.

19. The method of claim 18, further comprising determining, by the processor, when the secondary locking system has failed based on a second gap distance that is greater than the secondary gap distance.

20. The method of claim 19, further comprising:

coupling a plurality of sensors to the front edge, each sensor of the plurality of sensors located proximate a respective primary lock;

sensing, by each sensor of the plurality of sensors, a respective separation distance; and determining by the processor, based on a supplementary separation distance and the predetermined flexibility of the transcowl, when a primary lock has failed.

* * * * *